April 22, 1969  T. TODA ET AL  3,439,703

FLOW CONTROL VALVE FOR BLOW-BY GAS

Filed June 6, 1967

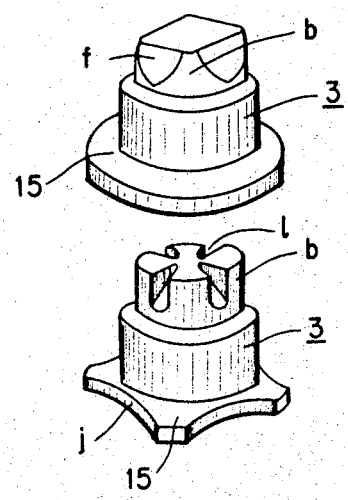
FIG. 4A
FIG. 4B
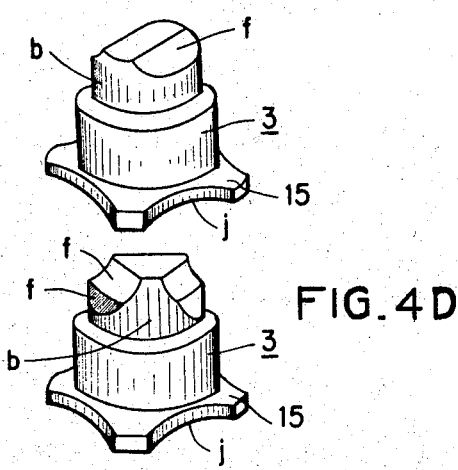
FIG. 4C
FIG. 4D
FIG. 7A  FIG. 7B
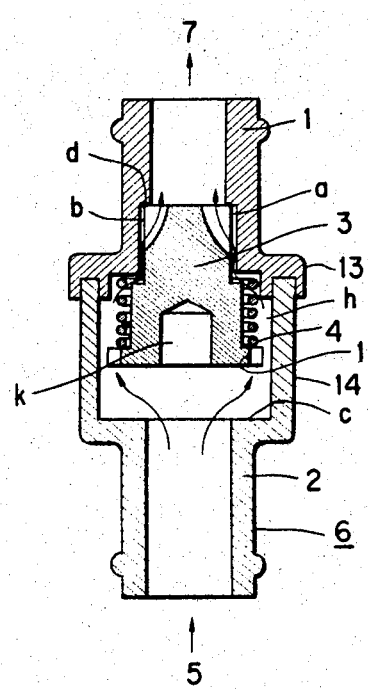
FIG. 5A
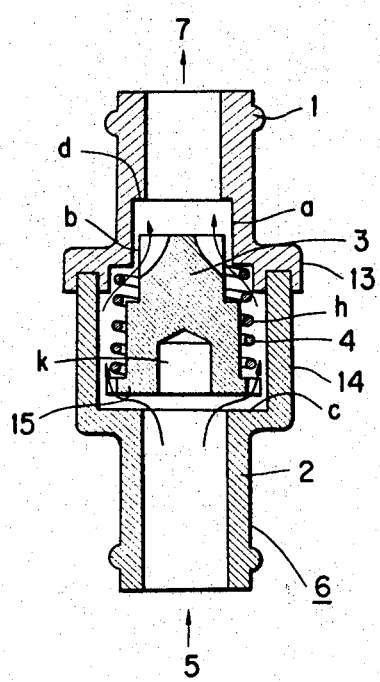
FIG. 5B
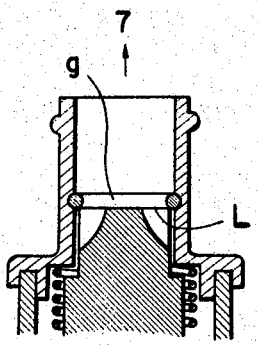
FIG. 6

United States Patent Office 3,439,703
Patented Apr. 22, 1969

3,439,703
FLOW CONTROL VALVE FOR BLOW-BY GAS
Tadahide Toda and Mitsumasa Yamada, Toyota, and Haruyuki Obata, Higashi-Kamogun, Japan, assignors to Toyota Jidosha Kogyo Kabushiki Kaisha, Toyota-shi, Japan, a corporation of Japan
Filed June 6, 1967, Ser. No. 643,941
Claims priority, application Japan, June 11, 1966, 41/55,375
Int. Cl. F02f 9/02; F16k 15/00
U.S. Cl. 137—480                2 Claims

ABSTRACT OF THE DISCLOSURE

This invention relates to a valve for controlling the flow of blow-by gas in an internal combustion engine as that gas is being returned to the intake system on the downstream side of the carburettor. The valve member has a chamfered end and so cooperates with a seat within a specially designed casing as to provide a minimum passageway for the blow-by gas which is not easily clogged.

---

This invention relates to a flow control valve, and particularly to a flow control valve positioned in the path of travel of the blow-by gas in an engine crankcase, and through which said blow-by gas is circulated to the cylinder for recombustion.

Among the noxious gases discharged from automobiles, etc., into the atmosphere, the so-called "blow-by gas," which leaks through the gap between a piston and its cylinder into the crankcase, is mainly composed of a mixture of unburnt gases having a high concentration of hydrocarbons and has been one of the greatest sources of air pollution. However, such blow-by gas has a chemical composition such that it can be reburned. Therefore, the proposal has already been made that a closed or open crankcase be adopted instead of the conventional crankcase communicating directly with the atmosphere and discharging a noxious blow-by gas into the atmosphere. By using said closed or open crankcase, the discharge of blow-by gas into the atmosphere will be cut off and said gas will be recirculated to the suction side of engine, where it is reburned, thereby contributing to the mitigation of air pollution.

In the construction of the recirculation system, there are different ways in which the blow-by gas is returned to different points on the suction side. Our invention relates to a recirculation system in which the gas is returned on the downstream side of the carburettor. In this system the essential point is to keep the air-fuel ratio of the original mixture, i.e., the ratio of air weight to fuel weight, at an optimum value, and at the same time to ensure perfect recombustion of the blow-by gas. For this purpose, the recirculation system is provided with a blow-by gas flow control valve to keep the rate of gas flow at an optimum value.

Meanwhile, the leakage of blow-by gas is generally larger, when the engine is turning over at high speeds and when the load on the engine is greater. As the load diminishes, the leakage decreases. On the contrary, the negative pressure in the suction pipe downstream of the carburettor is higher and the suction exerted on the blow-by gas is stronger, at the lighter load when the blow-by gas is less. Therefore, the required characteristics of said control valve to regulate the circulation of blow-by gas will be such that when the negative pressure on the intake manifold side downstream of the carburettor is high, the effective area of the gas flow passage through the valve is reduced so as to cut down the flow rate of a less concentrated blow-by gas; and when the negative pressure on the intake manifold side is low, the effective area of the gas flow passage through the valve is enlarged so as to increase the flow of a more concentrated blow-by gas.

There are several types of such control valves available, and usually, the floating piston type which is actuated by the negative pressure of the intake manifold is recommended on account of its good performance. But in this type, the piston is bored with a small orifice of definite dimensions in order to provide the minimum area of blow-by gas flow and this orifice tends to become fouled or clogged with lubricating oil or steam, so as to become inoperative after a short time of service, unless a great deal of time is devoted to its maintenance and inspection.

Thus, the main objective of this invention is to provide a blow-by gas flow control valve of the floating piston type which is free of small orifices likely to be directly contaminated, and which can therefore be expected to afford a desirable valve action.

Another objective of this invention is to provide a blow-by gas flow control valve with a high reliability of performance, in which the floating piston, when in closed position, is spring biassed against the valve seat of the crankcase within the casing, and said piston, when in open position, is attracted by the negative pressure of the intake manifold, which then overcomes the force exerted by the spring, thereby making the piston head, the face of which is provided with peripheral chamfers, fit into the reduced-diameter portion of the valve casing with the face of the piston head in contact with a valve seat in said casing portion. A minimum flow path area for the blow-by gas flow is provided by the gap between the piston head and reduced-diameter portion of the valve casing, so that the floating piston is designed to reduce the gas flow when the negative pressure on the intake manifold side is high and is free to move axially or rotate within the valve casing about its axis. The gap which provides the minimum flow path area is protected from fouling by lubricating oil or steam because it is constantly cleaned by light contact between the reduced-diameter portion of the valve casing and the piston head.

Still another objective of this invention is to provide a blow-by gas flow control valve which can be readily adjusted by adopting the standard orifice system, that is, by keeping the dimensions of the reduced-diameter portion of the casing constant and varying the weight and size of piston and the stiffness of the spring which biasses the piston.

A fourth objective of this invention is to provide a blow-by gas flow control valve in which the chamfers provided about the periphery of the face of the piston head comprise at least two vertical notches or bevels; the sectional area of the chamfers formed by said notches or bevels in planes normal to the axis of the piston is gradually increased toward the face of piston head; and as the piston head is progressively inserted into the reduced-diameter portion of the valve casing, the area of the blow-by gas flow passage is successively reduced from full open to its minimum area.

A fifth objective of this invention is to offer a blow-by gas flow control valve in which the valve seat in the reduced-diameter portion of the valve casing which is contacted by the piston head consists of a ring spring which expands into an annular groove provided on the inside wall the reduced-diameter portion of the valve casing. Under this arrangement, the valve seat, when worn, can be replaced and at the same time an automatic adjustment is effected when the face of the piston head meets the valve seat, thereby assuring an accurate valve action.

These objectives and others, and the characteristic features of the invention, will be more readily understood from the following description taken in conjunction with the accompanying drawings, in which:

FIGURE 1A shows the case in which the crankcase is of the closed type;

FIGURE 1B shows the case in which the crankcase is of the open type;

Figure 3:
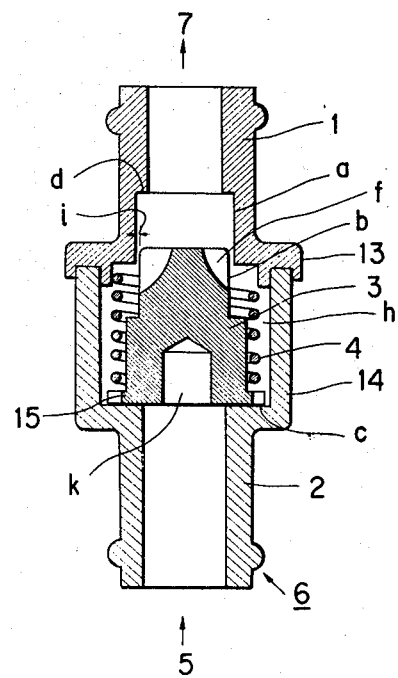
FIGURE 3 shows a longitudinal section of a blow-by gas flow control valve according to one embodiment of this invention.

FIGURES 4A, B, C and D are perspective views showing four embodiments of the floating piston to be employed as the valve body for the blow-by gas flow control valve according to this invention;

FIGURES 5A and 5B are axial sectional views showing the blow-by gas flow control valve of FIGURE 3 at two different operating positions;

FIGURE 6 is an axial sectional view showing the valve seat at the reduced-diameter portion of casing which fits the tip of the floating piston head, said valve seats being shown as a ring spring; and FIGURES 7A and 7B are plan views showing two examples of said ring spring.

Figure 1:
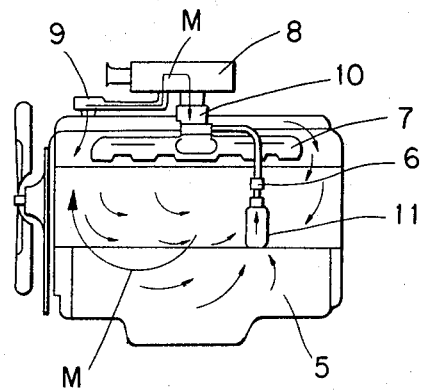
FIGURES 1A and 1B show the path of travel of the blow-by gas within the crankcase of an automobile engine equipped with a blow-by gas flow control valve according to this invention.
Figure 2:
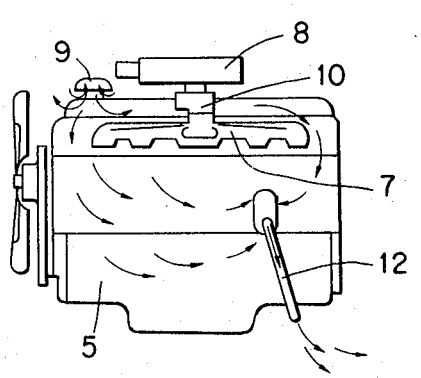
FIGURE 2 shows an engine of the conventional type in which the blow-by gas is discharged into the atmosphere, in the same way as in FIGURE 1.
Figure 1:
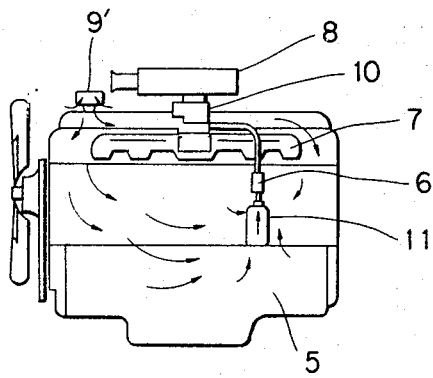

FIGURE 1A illustrates an engine with a closed type crankcase and FIGURE 1B an engine with an open type crankcase. In either of these, there is a blow-by gas flow control valve 6, one end of which opens through an oil-drain box 11 into the crankcase 5, while the other end of said valve communicates with the intake manifold 7 downstream of the carburettor 10. In this arrangement, the blow-by gas leaking into the crankcase 5 will, in view of the negative pressure on the intake manifold side, open the control valve 6 in the direction indicated by the small arrows and, via the oil-drain box 11, join the air sucked in through the air cleaner 8 and the carburettor 10 in case the crankcase is of a closed type as in FIG. 1A or through the cap 9′ in case the crankcase is of an open type as in FIG. 1B, and the mixed gas will be recirculated into the engine. Whereas in FIGURE 1A the ventilation cap 9 at the top of the casing communicates with the air cleaner 8, in FIGURE 1B the ventilation cap 9′ communicates with the atmosphere. This difference between the ventilation caps 9, 9′ results in a difference in the method of treating the blow-by gas at full load on the engine. At full load on the engine, the negative pressure on intake manifold side 7 is low and accordingly the blow-by gas is not sucked in, since the control valve 6 does not open. Then, in FIGURE 1A, the blow-by gas will travel in the M arrow direction and will be sucked through the air cleaner 8 into the carburettor 10, but in FIGURE 1B, this gas will continue to stay in the casing, only part of it being discharged into the atmosphere. Even the arrangement shown in FIGURE 1B, i.e., with an open type crankcase, which is slightly inferior in its air pollution preventing effect to the one with a fully-closed crankcase shown in FIGURE 1A, will be found incomparably superior to the conventional arrangement illustrated in FIGURE 2, in which the crankcase is directly connected through the ventilation pipe 12 to the atmosphere and the blow-by gas is always discharged into the atmosphere by the breathing action of the engine. It goes without saying that both of applicants' arrangements are markedly effective for mitigating the air pollution.

Moreover, according to this invention, the control valve 6 can be designed as illustrated in FIGURE 3. The casing of this control valve consists of the upper half 1 connected to the intake manifold 7 and the lower half 2 communicating with the crankcase 5. The enlarged parts 13, 14 formed below and above the casing halves 1 and 2 are firmly fitted together to define a valve chamber $h$. This valve chamber houses the valve body, i.e, the floating piston 3, which is always biassed against the valve seat C on the crankcase side by the spring 4 elastically inserted between the lower flange 15 of said piston and the inside top wall of the enlarged part 13 of the upper half of the casing. The head $b$ of the floating piston 3 has a reduced diameter and is provided with ventilating notches or chamfers $f$ around the periphery of its face. When said piston 3 is drawn upward against the resistance of the spring 4, the piston will enter into the reduced-diameter portion $a$ of the upper casing half, leaving a clearance $i$, and then stop at the shoulder $d$, which acts as the valve seat on the intake manifold side. The above-mentioned notches at the tip of piston head are designed to open into the narrowest part of the upper casing half 1.

Thus, in the control valve 6 of this invention, under idling conditions, and with only a light load on engine, when the negative pressure on the intake manifold side is high, the floating piston 3, as indicated on the left in FIGURE 5, will rise under suction until it hits the valve seat or shoulder $d$ of the portion $a$ in the upper casing half 1; and as a result the chamfer $f$ will enter into the portion $a$, leaving only the clearance $i$, resulting from the difference in diameter between the casing portion $a$ and the piston head $b$, as a ventilation path.

The blow-by gas passes through the minimum flow path afforded by this narrow gap $i$ and is sucked into the intake manifold 7. Thus, the primary aim of narrowing the effective flow path of the blow-by pass under high negative pressure and controlling the flow rate of gas can be attained.

At full load, as stated above, the negative pressure on the intake manifold side is low and the capacity to draw in the blow-by gas is lost, and the control valve 6 is in the closed position shown in FIGURE 3. At partial load, i.e., medium to high load when the negative pressure on the intake manifold side is lower than at idling or low load and the leakage of blow-by gas is larger than at idling or low load, the floating piston 3, as indicated in FIGURE 5B, will halt at an intermediate position at which the negative pressure on the intake manifold side balances the force of the spring 4, and as a result, a considerable open cross-sectional area will be left between the notch or chamfer $f$ of the piston head $b$ and the section $a$, permitting the passage of a larger amount of blow-by gas.

FIGURES 4A–4D illustrate different embodiments of floating piston 3. In these embodiments, a hollow part may be provided for the purpose of reducing the weight, as shown at $k$ in FIGURE 3, or a cut $j$ may be made in the lower flange 15. The chamfer at the periphery of the face of the piston head $b$ may take the form of a bevel $f$ or a vertical notch $e$ for convenience in machining or to insure non-eccentric, exact vertical movement of the piston in the section $a$. For this reason it is desirable to provide a plurality of said bevels $f$ or vertical notches $e$ at the periphery of the face of the piston head $b$. The cross sections of these bevels or vertical notches in a plane perpendicular to the axis of the piston are progressively larger toward the tip of piston head. Therefore at partial load, as shown in FIGURE 5B, the ventilating gap formed between the entrance to the section $a$ and the chamfer $f$ or notch $e$ will depend on the depth to which the piston head $b$ fits into the section $a$, and therefore on the negative pressure on the intake manifold side. Thus, successive variations in the sectional area of blow-by gas passage from its totally open position to the minimum open position given by complete insertion of the chamfer $f$ or notch $e$ into the section $a$ will be available. Or, as illustrated in FIGURE 4D, the chamfer $f$ or vertical notch $e$ may be formed in steps so that the flow rate of blow-by gas can be decreased stepwise.

FIGURE 6 shows a modification of the valve seat at the reduced-diameter portion. In this valve seat instead of an annuuar shoulder $d$, an annular groove L is provided on the straight wall of the desired-diameter portion and a ring spring $g$ is press-fitted into this groove. In FIGURES 7A and 7B, $g_1$ and $g_2$ show in plan view two modifications of this ring spring. The reduced-diameter portion of the casing and the upper passage are integrally formed so that the reduced-diameter portion can be machined with high precision. The valve seat, if worn out, can be readily replaced. The valve seat surface, against which the face of the piston head $b$ is biassed, has an arcuate surface, while the piston head $b$, when it engages the valve seat, ensures exact contact with the valve seat without deflection to either right or left. Moreover, if the tip of the piston head is frusto-conical instead of cylindrical, better results will be obtained.

From the above explanation, it is apparent that in the control valve of this invention, the rate of flow of blow-by gas drawn through the control valve 6 by the negative pressure at the intake manifold can be freely varied by properly selecting the weight of the floating piston 3, the stiffness of the spring 4, and the shape and number of the chamfers $f$ or vertical notches $e$ on the piston head $b$, and by adjusting the gap $i$ between the reduced-diameter casing section $a$ and the piston head $b$ by the standard orifice system. Thus the same control valve 6 may be applied to different engines.

In particular, the floating piston 3 cannot only move in a vertical direction, but may also rotate about its longitudinal axis. It is also devoid of any small orifice which is likely to be clogged. In the action of the floating piston 3, the vertcal movement and rotation keep the reduced-diameter portion $a$ and the piston head $b$ in off and on contact so that any dirty deposit clogging the gap $i$ will be scraped off by abrasion. Thus it is obvious that the minimum blow-by gas passage in said control valve can be kept open with extremely high reliability.

What is claimed is:

1. A valve for controlling the flow of blow-by gas in an internal combustion engine, said valve comprising:
    a valve casing defining a valve chamber and axially aligned passageways on opposite sides of said chamber, one of said passageways being provided with a peripheral groove,
    an annular valve seat in the form of a resilient ring positioned within said one passageway,
    a floating valve member in said valve chamber having a portion terminating in a face and dimensioned to fit with clearance into said one passageway, and
    resilient means biasing said valve member away from said seat, said valve member being provided with a plurality of chamfers regularly spaced about the periphery of said face so as to leave a continuous passageway extending between said valve seat and chamfers and through said clearance when said valve member is against said seat.

2. A valve for controlling the flow of blow-by gas in an internal combustion engine, said valve comprising:
    a valve casing defining a valve chamber and axially aligned passageways on opposite sides of said chamber,
    an annular valve seat within one of said passageways,
    a floating valve member in said valve chamber having a portion terminating in a face and dimensioned to fit with clearance into said one passageway, and
    resilient means biasing said valve member away from said seat, said valve member being provided with a plurality of chamfers regularly spaced about the periphery of said face so as to leave a continuous passageway extending between said valve seat and chamfers and through said clearance when said valve member is against said seat,
    each chamfer comprising at least two surfaces, one more remote from the face of the valve member than the other, said one surface being positioned at a more acute angle to the axis of the valve member than the other.

References Cited

UNITED STATES PATENTS

| | | | |
|---|---|---|---|
| 1,509,520 | 9/1924 | Martocello | 137—513.5 |
| 2,516,825 | 7/1950 | Hejduk et al. | 251—122 |
| 2,574,851 | 11/1951 | Wagner | 137—625.3 |
| 2,742,057 | 4/1956 | Krieck | 138—45 |
| 3,111,138 | 11/1963 | Humphreys et al. | 137—480 |
| 3,164,141 | 1/1965 | Jones. | |
| 3,305,207 | 2/1967 | Calderoni et al. | 251—205 X |
| 3,359,960 | 12/1967 | Pittsley. | |
| 3,365,166 | 1/1968 | Smith | 251—122 X |

AL LAWRENCE SMITH, *Primary Examiner.*

U.S. Cl. X.R.

123—119; 137—513.5, 540